Figure 1:
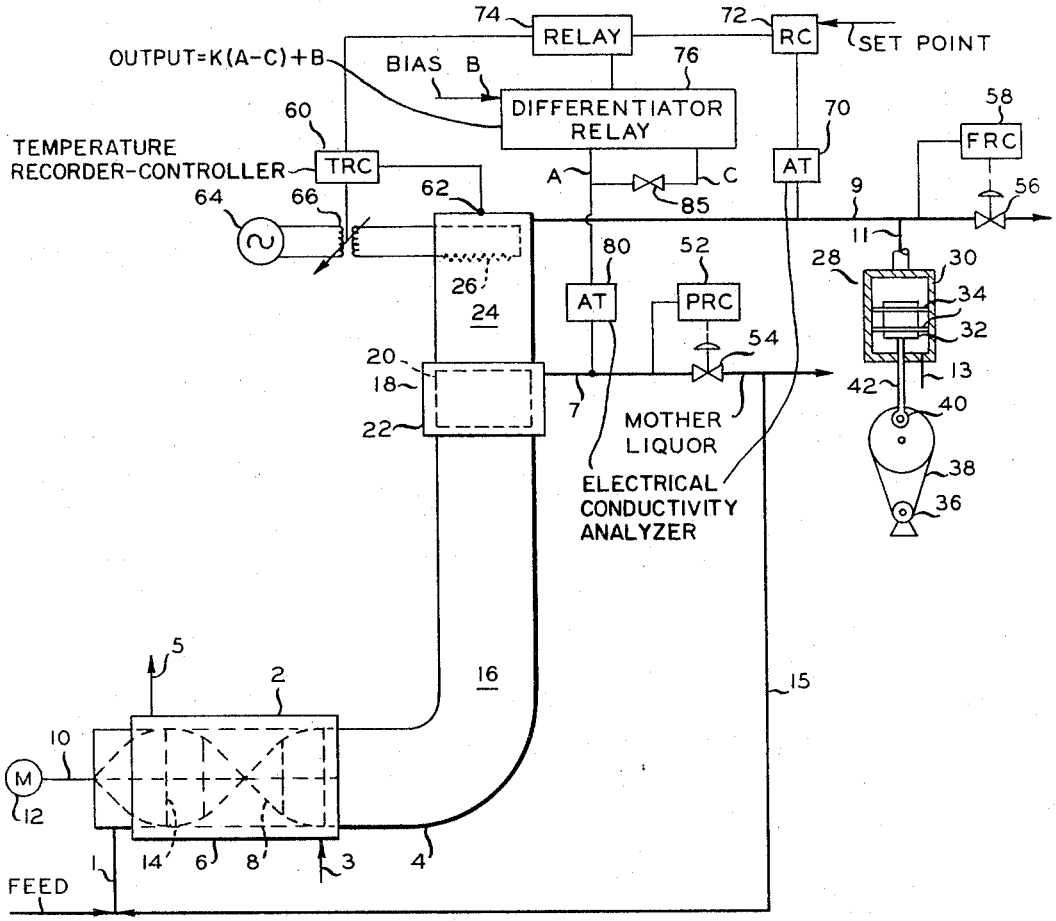

Jan. 10, 1967 F. L. STOLLER 3,296,811
FRACTIONAL CRYSTALLIZATION MELT CONTROL RESPONSIVE
TO PRODUCT COMPOSITION
Filed Dec. 20, 1963

INVENTOR.
F. L. STOLLER
BY *Young & Quigg*
ATTORNEYS

United States Patent Office

3,296,811
Patented Jan. 10, 1967

3,296,811
FRACTIONAL CRYSTALLIZATION MELT
CONTROL RESPONSIVE TO PRODUCT
COMPOSITION
Frederick L. Stoller, Bartlesville, Okla., assignor to
Phillips Petroleum Company, a corporation of Delaware
Filed Dec. 20, 1963, Ser. No. 332,166
6 Claims. (Cl. 62—58)

This invention relates to selective separation of mixtures by crystallization. In one aspect this invention relates to method and apparatus for determining the quality of fractional crystallization products. In another aspect this invention relates to method and apparatus for controlling fractional crystallization processes.

Purification by means of fractional crystallization has been known for a number of years. Schmidt, Re. 23,810 (1954), discloses a process and apparatus for purifying crystals, which process involves moving a mixture of crystals and adhering liquid through a liquid removal zone, a reflux zone and a melting zone, removing liquid in said liquid removal zone, melting crystals in said melting zone, withdrawing part of the melt as product and forcing another part of the melt in a direction countercurrent to the movement of crystals in said reflux zone. Thomas, U.S. 2,854,494 (1958), discloses a process and apparatus for effecting separation by fractional crystallization at high throughput rates, improved stability and ease of operation, improved heat distribution, and production of high purity products over long periods of operation. In this patent solids are countercurrently contacted with a reflux liquid in a purification zone, the solids in said zone being contacted with an intermittent flow of reflux liquid simultaneously with a propulsion of the solids through said zone. The countercurrent intermittent flow of reflux liquid with the solids is obtained by applying a pulsating pressure to the melt in a purification column. These processes are generally applicable to the separation of at least one pure component from any mixture which is resolvable into its components by fractional crystallization. For example, the processes can be used for the concentration of fruit juices, vegetable juices, beer, wine, and other materials which comprise aqueous solutions which can be concentrated by the formation and removal of ice crystals.

Recently much development work has been conducted for the concentration of beer by fractional crystallization. In the operation of pulse crystal purification columns concentrating beer, a slurry of water crystals and mother liquor (beer concentrate) is passed from a chiller into the prefilter section of the column and then through a filter zone, wherein a portion of the mother liquor is removed through the filter leaving a crystal bed containing 60 to 75 percent water crystals. The crystal bed then passes to a melter zone where heat is added to melt the purified crystals and the resulting water is removed from the column. To achieve a high purity product in fractional crystallization processes it is highly desirable that the solids content of the crystal bed moving through the crystal purification column be held constant because transport of the bed through the reflux zone to the melt zone is made easier and channeling of the bed with reflux liquid is reduced.

Prior practices for controlling a crystal purification column have included holding a constant back pressure on the mother liquor flow from the column by means for restricting mother liquor flow and thereby controlling the solids content of the crystal bed. However, as the pressure at the inlet of the column varies, the flow of mother liquor varies and subsequently the solids content of the crystal bed fluctuates. Another method employed has been to continuously control the rate of product withdrawal from the purification column so as to obtain a product of desired high purity. Such control is accomplished by regulating the withdrawal of mother liquor from the filter zone in response to a measurement of pressure drop across the column.

I have discovered an improved way for determining the composition of the products of a crystal purification column and a control system for regulating the operation of the column in response thereto.

Accordingly, it is an object of my invention to provide an improved method for determining the compositions of fractional crystallization products. Another object of my invention is to provide an improved method for controlling the operation of a crystal purification column to obtain desired product compositions. Still another object of my invention is to provide an improved control system for use in combination with crystal purification apparatus.

Other objects, aspects and advantages of my invention will be apparent to those skilled in the art from the study of this disclosure, the accompanying drawing, and appended claims.

Broadly, my invention resides in improved control of crystal purification processes and apparatus. In accordance with my improved control system, the heat input to the melt zone of a column is regulated in response to an electrical conductivity measurement of liquid removed from the melt zone. In another embodiment of my invention, the heat input to the melt zone of a crystal purification column is regulated in response to an electrical conductivity measurement of the mother liquor withdrawn from the filter section of the column.

My invention provides continuous control of the rate of heat input to the melt section of a purification column so as to obtain products of desired purities.

My invention is applicable to the resolution of a vast number of simple binary and complex multicomponent mixture systems containing ionizable components by fractional crystallization processes and apparatus. In this regard, I have found that in the concentration of beer by fractional crystallization the ratio of ionizable components to alcohol content in the beer remains constant as the beer is concentrated. Therefore, I have found that a measurement of the electrical conductivity of the beer concentrate and/or the water removed therefrom furnishes an indication of the composition of the beer concentrate product.

My invention will now be more fully described with reference to the accompanying drawing which illustrates a cross-sectional diagrammatic representation of a fractional crystallization system which includes the control system of my invention.

Figure 2:
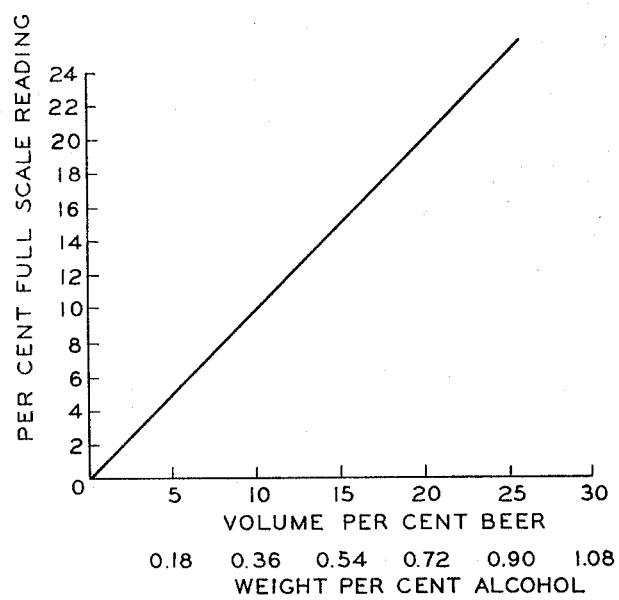

FIGURE 1 shows fractional crystallization apparatus and the control system of my invention; and FIGURE 2 is a graph showing the relation of beer composition to measurement readings based on electrical conductivity.

Referring now to the FIGURE 1, a feed mixture comprising two or more components, such as beer, one of which is separable from the mixture by crystallization, is passed through conduit 1 into freezing zone 2. Freezing zone 2 comprises housing 4 surrounded by cooling jacket 6 having inlet 3 and outlet 5 for passage of cooling medium therethrough. Agitating or scraping means 8 are positioned within housing 4 and are designed to prevent accumulation of solid material on the inner surface of housing 4. Scraping means 8 can be constructed of strips of metal or other suitable material and can be fabricated in the form of a helix, as shown in the drawing, or can be straight. Any form of scraping means 8 can be provided. Scraping means 8 are mounted on a rotatable shaft 10 by spoke members 14. Shaft 10 is actually positioned within housing 4 and is driven by motor 12. Sufficient cooling medium is circulated through jacket 6 to freeze a predetermined amount of solid crystals from the feed passing therethrough.

The resultant slurry of crystals and mother liquor produced in freezing zone 2 is passed therefrom directly into prefilter zone 16 and then into filter zone 18. Filter zone 18 is an extension of housing 4 and freezing zone 2. Filter zone 18 comprises a suitable filter screen or medium 20 and an external shell 22, the latter being provided with an outlet conduit 7 for removal of the filtrate. Filter medium 20 can be of various types. Examples of such a medium are metallic screens, sintered perforate metals members, perforate members supporting filter cloths, and the like. A portion of the mother liquor is recycled to chiller 2 through conduit 15 with the remainder being removed as product.

After removal of the mother liquor, the remaining crystal mass passes to reflux zone 24 which is an additional extension of housing 4. In reflux zone 24 the crystal mass is countercurrently contacted with liquid reflux. The opposite end of the reflux zone 24 from filter 18 is a melt section having a heating element 26 therein. Heating element 26 can be in the form of an electrical heater (as shown) or a heat transfer coil through which a suitably heated fluid is pumped. Electrical power is transmitted to electrical heating element 26 from power source 64 by means of a suitable variable power-transferring device, such as a servo motor rotated variable transformer 66. As the crystal mass approaches heating element 26 in the top of reflux zone 18, the crystals are melted. Part of the melt produced by heater element 26 is withdrawn through conduit 9 as the high-purity product of the process. The remainder of the melt is forced back into reflux zone 24 to form reflux which effects crystal purification. The liquid forced from the crystals in the reflux zone is drawn off through conduit 7 together with the mother liquor filtrate.

Pulsation-producing means 28 communicates with the purification column through conduits 11 and 9 to force the reflux countercurrent to the crystal flow in reflux zone 24. Pulsation-producing means 28 comprises a cylinder 30 with a reciprocal piston 32 therein. Piston 32 is suitably sealed in cylinder 30, for example by means of rings 34, to prevent the leakage of melt from the purification zone. The reciprocation of piston 32 is produced, for example, by electric motor 36, a belt 38, a crank means 40 and connecting rod 42, which is sealed in housing 30 by means of a packing gland. An outlet 13 is provided in housing 30 to facilitate reciprocation of piston 32 and can be connected to means, not shown, for recovery of any material which might escape from the purification column in case of failure of rings 34. The reciprocation of piston 32 can be at any suitable rate, such rate being dependent upon the separation being made in the column and the solids content maintained therein. Generally, pulsations will be produced from the reciprocation of piston 32 in the range of about 100 to about 500 pulsations per minute.

Pressure recorder-controller 52 operatively connected to conduit 7 manipulates valve 54 in conduit 7 to regulate the withdrawal of mother liquor therefrom. Flow recorder-controller 58 operatively connected to conduit 9 manipulates valve 56 in conduit 9 to regulate the flow of liquid withdrawn therefrom. Temperature recorder-controller 60, receiving a signal from thermo-couple 62 positioned in the melt section of reflux zone 24, passes a control signal to regulate the position of variable transformer 66 controlling the quantity of energy passed to heating element 26 and, in turn, the amount of heat added to the melt section of reflux zone 24.

Analyzer transmitter 70 operatively connected to conduit 9, measures the electrical conductivity of the liquid in conduit 9, thus giving an indication of the composition of the product produced from the column. The signal produced by analyzer transmitter 70 is passed to recorder-controller 72 where it is compared with a set-point signal representative of the desired composition to produce a control signal which is passed to selective relay 74. Analyzer transmitter 80, operatively connected to conduit 7, measures the electrical conductivity of the liquid in conduit 7, thus giving an indication of the composition of the mother liquor produced from the column. The signal produced by analyzer transmitter 80 is transmitted to differentiator relay 76 wherein a mathematical differentiation of the change in composition of the fluid in conduit 7 with respect to time is made and a biased signal representative thereof is passed to selective relay 74. Selective relay 74 selects the lower of signals from recorder-controller 72 and relay 76 and transmits the selected signal to temperature recorder-controller 60, which compares such signal with a signal from temperature sensing element 62 and transmits a control signal to variable transformer 66. The instruments employed in the control system of this invention can be electrical, pneumatic, hydraulic or mechanical. Suitable pneumatic instruments available for performing the control network comprises the following: Selective relay 74—Taylor low pressure selective relay, Model SK1359. Relay 76—Foxboro's Model 56 computing relay manufactured by the Foxboro Company, Foxboro, Massachusetts, modified for differentiation as described in U.S. Patent 2,677,385. Analyzer-transmitters 70 and 80—electrical conductivity cells, such as described in U.S. Patent 2,358,163, conventionally modified to transmit a pneumatic signal.

In FIGURE 2, the relation of weight percent alcohol and volume percent beer to electrical conductivity measurements is shown. The data for this graph was obtained by conductance bridge measurements at room temperature of beer-distilled water mixtures. The beer, Budweiser beer marketed by Anheuser Busch Company, contained 3.6 weight percent alcohol. The beer was diluted with various amounts of distilled water and electrical conductivity measurements were taken and recorded on a Type RD-Solubridge instrument manufactured by Industrial Instruments Incorporated. From this graph it is readily apparent that the conductivity value of the beer containing mixture is directly proportional to the beer concentration.

While the invention has been illustrated utilizing an indirect heat exchange freezing zone, it is within the contemplation of the invention to utilize direct heat exchange between a suitable refrigerant, such as propane, and the feed. Also, an external heater can be employed in place of the internal heater element 26 within the melt section of reflux zone 24 of the purification column.

The purity of the product from the crystal purification devices above described is determined by the effectiveness of the washing action of the reflux which passes in countercurrent relationship to the passage of the compact crystal mass. I have discovered that the composition of the mother liquor as it is withdrawn from the purification zone is indicative of the effectiveness of the purification. When the composition of the mother liquor too closely approaches the composition of the feed in the purification zone, this is an indication of channeling of pure product through portions of the crystal bed. This is corrected in my invention by decreasing the heat input to the melter unit to freeze the crystal mass and eliminate the channel. Likewise, when the concentration of beer in the water product increases, this indicates the water crystals are not being washed thoroughly by the reflux liquid. This is corrected by my invention by increasing the heat input to the melter unit to make more reflux water for washing the crystals.

Thus, I have discovered method and means for controlling the temperature within the melt zone of the column which regulates the compositions of the product streams and thus produces the desired purity of the products.

The following example is presented to further illustrate the invention, although it is not intended that the invention should be limited thereto.

*Example*

Regular strength beer containing 3.96 weight percent alcohol is passed at a rate of 107 gallons per hour through line 1 into chiller 2. If desired, this feed stream may be precooled by means of a precooler. The temperature of the beer in chiller 2 is reduced to about 14° F. The residence time in the chiller is such that slurry containing about 37 weight percent ice crystals is removed therefrom and introduced into the purification column. Water is removed through conduit 9 at a temperature of about 40° F. The concentrated beer is removed through conduit 7 at a temperature of about 14° F. The concentrated beer in conduit 7 contains about 18.7 weight percent alcohol. One hundred nine gallons per hour of the concentrated beer is recycled to the feed and 27 gallons per hour is removed as product. During the operation of the purification column, analyzer transmitter 70 measures the quantity of beer being removed with the water product. If this measurement indicates that too much beer is leaving the column with the water product, a signal is transmitted to temperature recorder-controller 60 which calls for more heat and allows more reflux to wash the crystals of beer. Likewise, analyzer transmitter 80 determines the concentration of the beer being removed through conduit 7. As the measurement of concentration indicates a decrease in the concentration of the beer, channeling of the column is indicated, and a signal is transmitted to temperature recorder-controller 60 to reduce the amount of heat being added to the melt section and allow the crystals bed to freeze and prevent the channeling. In my control system, selective relay 74 is designed to pass the lower of signals from analyzer transmitter 70 or 80 to temperature recorder controlling to obtain the instant control signal for temperature recorder-controller 60.

From the foregoing example it is readily apparent that I have provided an improved method for controlling a crystal purification process and apparatus wherein better operation of the apparatus is obtained and greater purity of product is produced.

In the operation of my control system, analyzer-transmitter 80 continuously measures and transmits a signal representative of the concentration of beer (mother liquor) to differentiator relay 76, which is a conventional adding relay modified to differentiate change in concentration with time. The concentration indicative signal is introduced to relay 76 at point A unrestricted and at point C restricted, as by a valve 85, to maintain the introduction of a signal of the desired value. Also, introduced to relay 76 is a bias signal, representative of the desired concentration, at B. Relay 76 solves the equation $O$ (output) = $K$ (constant) [$A$ (instant concentration signal) $-C$ (derivative of input signal A)] $+B$ (bias)

Signal O is continuously transmitted to relay 74 along with a signal from recorder-controller 72 and analyzer-transmitter 70 which is representative of the quantity of beer in the water product. Bias B to relay 76 will generally be near the maximum control signal to allow the signal from controller 72 to pass through relay 74 as a low signal and control the heat input except for major upsets in the column when the signal from relay 76 will be lower than that from controller 72 and will then control the column.

Although my invention has been described utilizing an electrical conductivity measurement of the purification column products as a preferred analysis, it is within the scope of my invention and is intended to be understood that other measurements of product composition may be employed by means of an analyzer, such as a refractometer, a gravitometer, an infrared analyzer, a mass spectrometer, or a chromatographic analyzer.

Variations and modifications within the scope of the disclosure and the appended claims can readily be effected by those skilled in the art without departing from the spirit and scope of this invention.

I claim:

1. In a process for fractional crystallization wherein a crystal mass containing some mother liquor is introduced into a purification zone and passed to a melt zone so that a first portion of resulting melt is caused to be displaced countercurrently through at least a portion of the crystal mass, the mother liquor stream is removed from the system and a second portion of the melt is removed from the system as products, the improvement which comprises determining the composition of one of the products removed from the purification zone by measuring the electrical conductivity of the said product and manipulating the heat input to the melt zone in response thereto.

2. In a process for fractional crystallization wherein a crystal mass containing some mother liquor is introduced into a purification zone and passed to a melt zone so that a first portion of resulting melt is caused to be displaced countercurrently through at least a portion of the crystal mass, the mother liquor stream is removed from the system and a second portion of the melt is removed from the system as products, the improvement which comprises measuring the composition of one of the products removed from the purification zone and manipulating the heat input to the melt zone in response thereto.

3. In a process for fractional crystallization wherein a crystal mass containing some mother liquor is introduced into a purification zone and passed to a melt zone so that a first portion of resulting melt is caused to be displaced countercurrently through at least a portion of the crystal mass, the mother liquor stream is removed from the system and a second portion of the melt is removed from the system as products, the improvement which comprises measuring the composition of the melt product and producing a first signal representative thereof; comparing said first signal with a desired composition value to produce a second control signal; measuring the composition of the mother liquor product and producing a third signal A representative thereof; establishing a fourth signal representative of the quantity $K(A-C)+B$, where K is a constant, C is the derivative of A with respect to time and B is a bias signal; and manipulating the heat input to the melt zone in response to the lower of said second and fourth signals.

4. In apparatus wherein a means is utilized to move crystals through an elongated crystal purification column having a crystal inlet, a mother liquor product outlet, and a melt product outlet, the improvement comprising means for determining the composition of one of the products of the column, and means for controlling the heat input to the melt zone of said column in response to said composition measurement.

5. The apparatus of claim 4 wherein said means for determining is an analyzer which measures electrical conductivity.

6. In apparatus wherein a means is utilized to move crystals through an elongated crystal purification column having a crystal inlet, a mother liquor product outlet, and a melt product outlet, the improvement comprising means for determining the composition of the melt product and producing a first signal representative thereof, means for comparing said first signal with a desired value and producing a second control signal; means for determining the composition of the mother liquor product and producing a third signal A representative thereof; means responsive to said means for producing said third signal to establish a fourth signal representative of $K(A-C)+B$, where K is a constant, C is the derivative of A with respect to time and B is a bias signal; means for selecting the lower of said second and fourth signals; and means for controlling the heat input to the melt zone of said column in response to said selected signal.

References Cited by the Examiner

UNITED STATES PATENTS

| | | | |
|---|---|---|---|
| 2,358,163 | 9/1944 | Heym | 165—11 |
| 2,894,997 | 7/1959 | Hachmuth. | |
| 3,078,586 | 2/1963 | Rey | 324—65 X |
| 3,093,649 | 6/1963 | Ratje. | |
| 3,150,500 | 9/1964 | Goard | 62—58 X |

NORMAN YUDKOFF, *Primary Examiner.*